(12) United States Patent
Alam et al.

(10) Patent No.: US 9,736,367 B1
(45) Date of Patent: Aug. 15, 2017

(54) VIDEO SYSTEM FOR REAL-TIME PANORAMIC VIDEO DELIVERY

(71) Applicant: Altia Systems, Inc., Cupertino, CA (US)

(72) Inventors: Naveed Alam, Cupertino, CA (US); Yashket Gupta, Santa Clara, CA (US); Ram Natarajan, Cupertino, CA (US); Oliver Gunasekara, San Jose, CA (US); Aurangzeb Khan, Portola Valley, CA (US); Lars Herlitz, Atherton, CA (US); Atif Sarwari, Saratoga, CA (US)

(73) Assignee: ALTIA SYSTEMS, INC., Cupertino, CA (US)

( * ) Notice: Subject to any disclaimer, the term of this patent is extended or adjusted under 35 U.S.C. 154(b) by 496 days.

(21) Appl. No.: 14/058,198

(22) Filed: Oct. 18, 2013

Related U.S. Application Data

(60) Provisional application No. 61/715,813, filed on Oct. 18, 2012.

(51) Int. Cl.
*H04N 5/228* (2006.01)
*H04N 5/232* (2006.01)

(52) U.S. Cl.
CPC .............................. *H04N 5/23238* (2013.01)

(58) Field of Classification Search
CPC .... H04N 5/2258; H04N 5/23216; H04N 9/09; H04N 13/0242; H04N 21/4223
See application file for complete search history.

(56) References Cited

U.S. PATENT DOCUMENTS

| | | | | |
|---|---|---|---|---|
| 8,223,845 | B1* | 7/2012 | Duvivier | H04N 19/80 375/240.24 |
| 2003/0156262 | A1* | 8/2003 | Baker | H04N 9/3147 353/31 |
| 2008/0089405 | A1* | 4/2008 | Cho | H04N 13/0282 375/240.01 |
| 2011/0263332 | A1* | 10/2011 | Mizrachi | A63F 13/12 463/42 |
| 2012/0184373 | A1* | 7/2012 | Kim | H04L 65/4084 463/42 |
| 2012/0307000 | A1* | 12/2012 | Doepke | G06T 7/0034 348/36 |
| 2013/0070047 | A1* | 3/2013 | DiGiovanni | H04N 5/222 348/36 |

* cited by examiner

*Primary Examiner* — Huy T Nguyen
(74) *Attorney, Agent, or Firm* — HM Law Group LLP; Vani Moodley, Esq.

(57) ABSTRACT

A system for video capture and delivery is disclosed. The system comprises a camera with multiple sensors to capture video at a first location, and to stitch images corresponding to the multiple sensors to produce a panoramic video having at least a 100 degrees field of view; and a cloud-based server to process the panoramic video for delivery to a plurality of client devices, and to stream the processed video to the plurality of client devices.

18 Claims, 10 Drawing Sheets

| Frame Rate | Frame Time | Total Frame Latency | Total Latency in ms |
|---|---|---|---|
| 15 | 66.66 | 2.9 | 193.314 |
| 30 | 33.33 | 2.9 | 96.657 |
| 60 | 16.66 | 2.9 | 48.314 |

VIDEO SYSTEM FOR REAL-TIME PANORAMIC VIDEO DELIVERY

This application claims the benefit of priority to US Provisional Patent Application Ser. No. 61/715,813, which was filed on Oct. 18, 2012, the entire specification of which is incorporated herein by reference.

FIELD

Embodiments of the present invention relate to systems and methods for panoramic video capture and delivery.

BACKGROUND

Video has become an important medium for the communication of information. Due to its visual nature, video has become very popular for hosting virtual meetings and in the field of security/surveillance. However, the generation of panoramic video with a wide field-of-view (FOV) in real time remains a challenge.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A system for video capture and delivery is disclosed. The system comprises a camera with multiple sensors to capture video at a first location, and to stitch images corresponding to the multiple sensors to produce a panoramic video having at least a 200° field of view; and a cloud-based server to process the panoramic video for delivery to a plurality of client devices, and to stream the processed video to the plurality of client devices.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
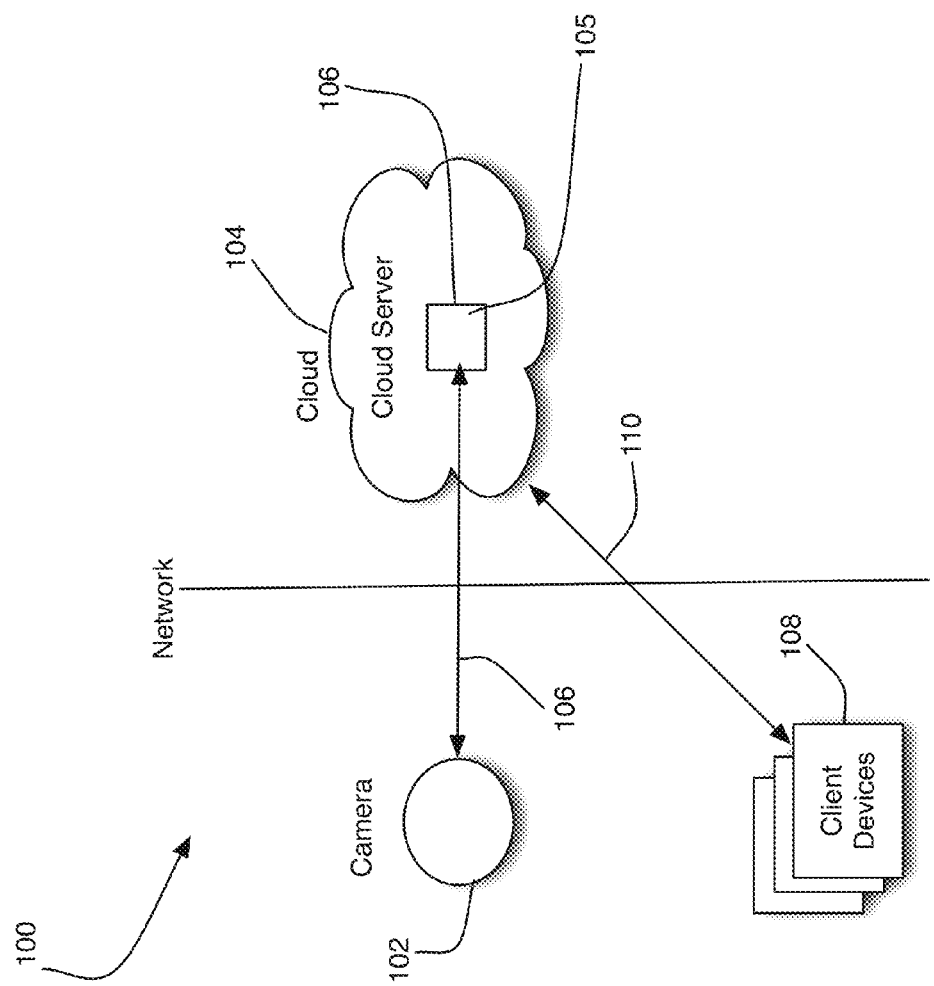
FIG. 1 shows the components of a Panacast video system, in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Described herein is a video system for delivering what is termed a 'PanaCast video experience'. The video system may be used to deliver panoramic-HD video and audio to participants in a video conference session (also referred to herein as a "Pancast" session). The participants may be geographically dispersed anywhere in the world with cellular or Internet networking connectivity. Elements of the PanaCast video experience include:

a panoramic video stream with an extended horizontal field of view that is greater than 100°;

support for frame rates required for full-motion video. i.e. frames rates up to 60 frames per second (FPS) are supported.

panoramic video containerized or packaged into standard video frames such as the H.264 standard;

support for DVR functions (such as pause, rewind, fast forward or on-demand save) on a live video stream;

support for capturing of images from a live video stream based on a user-selected region of interest full stitching of images from multiple imagers/sensors with at least minimal stitching artifacts;

support for ultra low latency rate-adapted video streaming.

FIG. 1 shows a system 100 for creating and delivering Panacast video, in accordance with one embodiment. As will be seen, the system includes an plurality of capture device (cameras) 102. As will be explained each camera 102 is configured to capture panoramic video, e.g. of a meeting in progress, and streams the video to a cloud switch fabric 104 by means of a transport link 106. In one embodiment, the transport link 106 may be a wired link or a wireless link, and may support packet-based communications in accordance with, e.g. the Internet protocol (IP). As will be described in greater detail, the cloud switch fabric 104 includes a cloud server b configured to perform certain optimizations on the panoramic video before streaming said video onward to one more client's device 108. Typically, client's devices 108 may represent any device capable of rendering video. As such, examples of client devices 108 include laptop computers, tablet computers, mobile phones etc. Delivery of panoramic video from the cloud switched fabric 104 to each of the client devices 108, and communications in general between the clouds switched fabric 104, and each of the client devices 108 may occur over a transport link 110, which is similar to above-described transport link 106.

Figure 2:
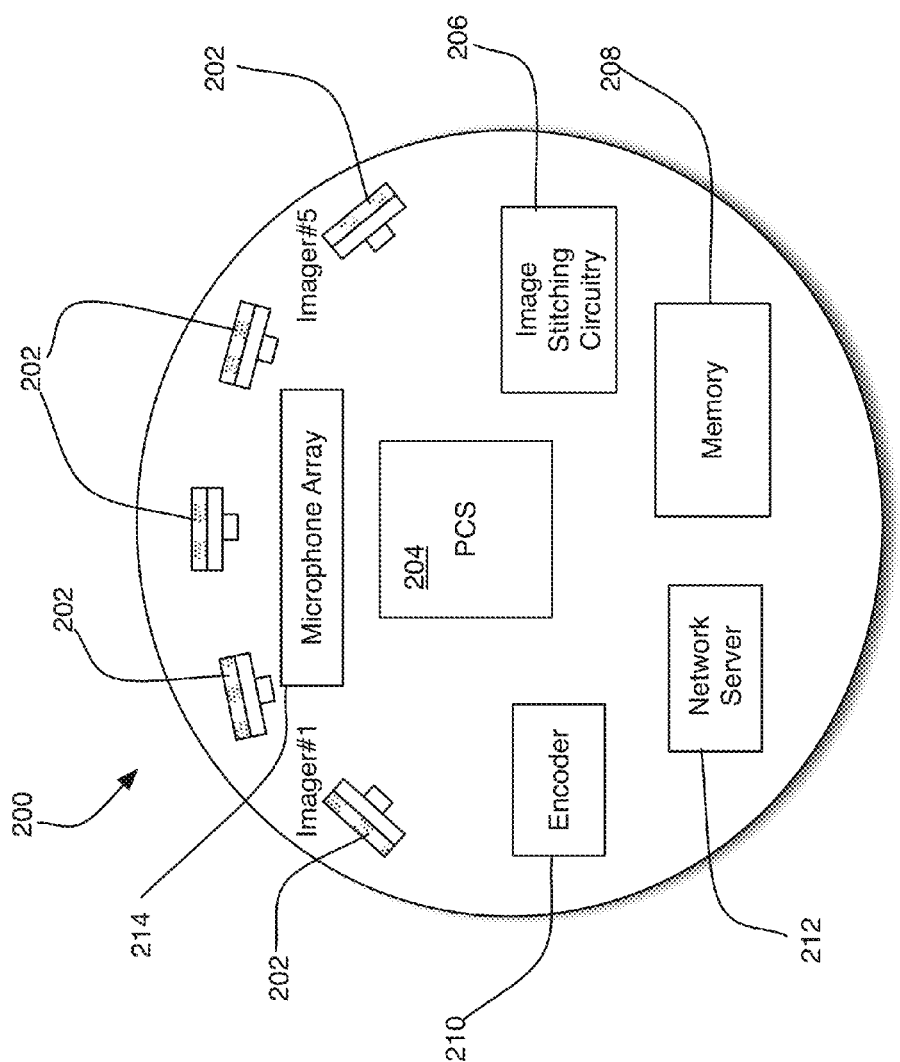
FIG. 2 shows hardware for a Panacast camera, in accordance with one embodiment of the invention.

FIG. 2 shows a high-level block diagram of hardware 200 which may be used to implement the cameras 102 of FIG. 1. The hardware 200 may be configured for generating panoramic images according to one embodiment of the invention.

The hardware 200 includes multiple imagers/sensors 202 mounted along an arc such that each imager 202 is directed to capture a portion of a scene. Each imager 202 may include suitable sensors, for example charge-coupled device (CCD) or complementary metal-oxide semiconductor (CMOS) imaging sensors, as is known in the art.

The system 200 also includes a camera server (PCS) 204, image stitching circuitry 206, memory 208, an encoder 210, and a one or more network interfaces 212. In one embodiment, digital signals recorded by sensors 202 are sent to PCS 204 for processing. In one embodiment, the PCS 204 may execute programs for implementing image-processing functions and other functions that will be described later, as well as for controlling the operation of the entire device 200 including its image capture operations. Optionally, the PCS 204 may include signal processing functionality for performing image processing, including image filtering, enhancement and for combining multiple fields of view in cooperation with the image stitching circuitry 206, as will be explained in greater detail below. Although shown separately, in some embodiments, the image stitching circuitry 206 may exist as part of the PCS 204. It is to be understood that components of the device 200 may take the form of hardware, software, firmware, or any combination of hardware, software, and firmware.

Digital signals representing a panoramic image may be stored in memory 208. In one embodiment, the encoder 210 may repack and compress panoramic images before transmission by a network server 212. The network server 212 may be configured to provide network connectivity to the device 200. As such, the server 212 may include network interfaces 212 such as wireless and wired interfaces, in accordance with different embodiments. For capturing audio, the hardware 200 includes a microphone array 214.

In one embodiment, each camera 102 is capable of generating an ultra low latency H.264 panoramic video stream delivering a wide (e.g. 200 degrees) horizontal field-of-view. In some cases each camera may generate a 360 degree horizontal FOV. The panoramic video may include a frame rate of up to 60 FPS.

In one embodiment, the network server 212 may be configured to constantly monitor network conditions and to adapt the video stream to provide optimum quality at a lowest possible latency given the current network conditions. In one embodiment, the network server 212 may additionally/optionally utilize rate adaptation to optimize the video delivery in real time via a H.264 encoder SoC resident within camera 102.

In one embodiment, the encoder 210 may encode video for enhanced content security.

In on embodiment, the camera 102 may be architected to work with a RJ45 Ethernet cable. Moreover the architecture may be scaled to work with different network links, such as WiFi, cellular 3G and 4G networks, etc.

In one embodiment, the cloud switch fabric 104 may be configured to manage connectivity between each camera 102 and all participants in a session. The cloud switch fabric 104 may deliver video streams to each participant. Optionally each stream may be individually optimized and rate-adapted based on the capability of the networking connection over which the stream is delivered.

In one embodiment, a highest video quality may be applied to a Region of Interest (ROI) associated with a particular participant/viewer.

In one embodiment, the cloud switch fabric 104 may effectively virtualize the camera inputs such that each participant can directly, individually and concurrently interact with any part of a video stream as they choose, independently of all other participants, and select any of the multiple cameras potentially made available within a single session.

The transport link 110 may be rate adaptive and may be used to deliver encoded information.

In one embodiment, each client device may be provisioned with a application (also referred to herein as the "Panacast" application). In one embodiment, the Panacast application may support the following operating systems: OS, Windows 7, Windows 8, Mac OS X, and Android. The PanaCast application may be configured to receive the video information from the cloud switch fabric 104 within container (e.g. a standard H.264 container), and to unpack and render the information to deliver the full panoramic-HD perspective (e.g. 2688×540 pixels), and allow for individualized and immediate/direct interaction with the video stream for each user. The PanaCast application may be used to setup, host and participate in a Panacast session.

In one embodiment, the PanaCast session may be initiated by scanning an electronic tag such as a Near-Field Communications (NFC) tag as is described in co-pending U.S. patent application Ser. No. 14/058,174 filed Oct. 18, 2013, which is incorporated herein by reference in its entirety.

In one embodiment, the PanaCast application may allow a participant to join a PanaCast session with a single click.

Extended FOV

In one embodiment, the PanaCast camera 102 is architected to synchronize and stitch videos from multiple cameras. This ability of the PanaCast camera greatly enhances the horizontal FOV of the stitched video.

The total H-FOV can be derived by the following equation $$HFOV=(n-2)*(FOVx-2*FOVy)+2*(FOVx-FOVy)$$

N: Total number of sensors
FOVx: Total FOV of each sensor
FOVy: FOV of the overlapping region Techniques for generating the stitched panoramic video are described in co-pending U.S. patent application Ser. No. 13/902,136 entitled "Locally Adaptive Luminance and Chrominance Blending in a Multiple Imager Video System", U.S. patent Ser. No. 13/902,186 entitled "Dynamic Stitching for a Multiple Imager Video System", and U.S. patent Ser. No. 13/902,248 entitled "Stitching for a Multiple Imager Video System Based On A Non-Linear Seam", each of which is incorporated herein in its entirety.

Figure 3:
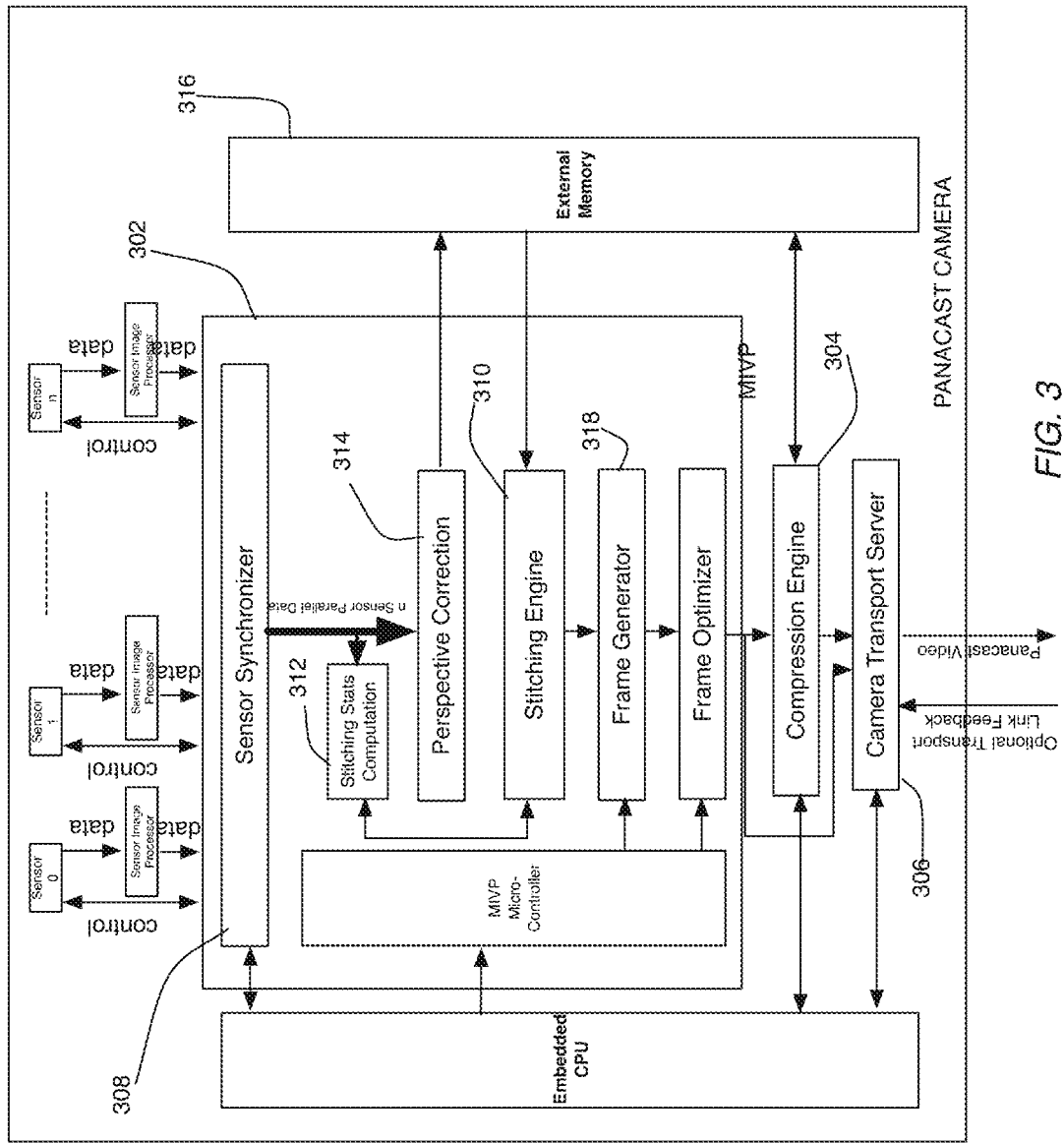
FIG. 3 shows the architecture of a Panacast Camera Server, in accordance with one embodiment of the invention.

In one embodiment, the PCS 104 may be configured to process video from a plurality of imagers, e.g. six imagers each with their own SOC ICs, in parallel. Within the PCS 104 video data buses may be synchronized, stitched and optimized for video performance. FIG. 3 shows the architecture the PCS 104, in accordance with one embodiment. As will be seen, the PCS 104 includes a multiple imager video processor (MIVP) 302, and compression engine 304, and a transport server 306.

The MIVP 302 may be used for the synchronization and the stitching of the multiple images to produce the PanaCast experience video, as will be explained. For descriptive convenience the frames of the PanaCast experience video will be referred to herein as a "PanaCast frame".

Figure 4:
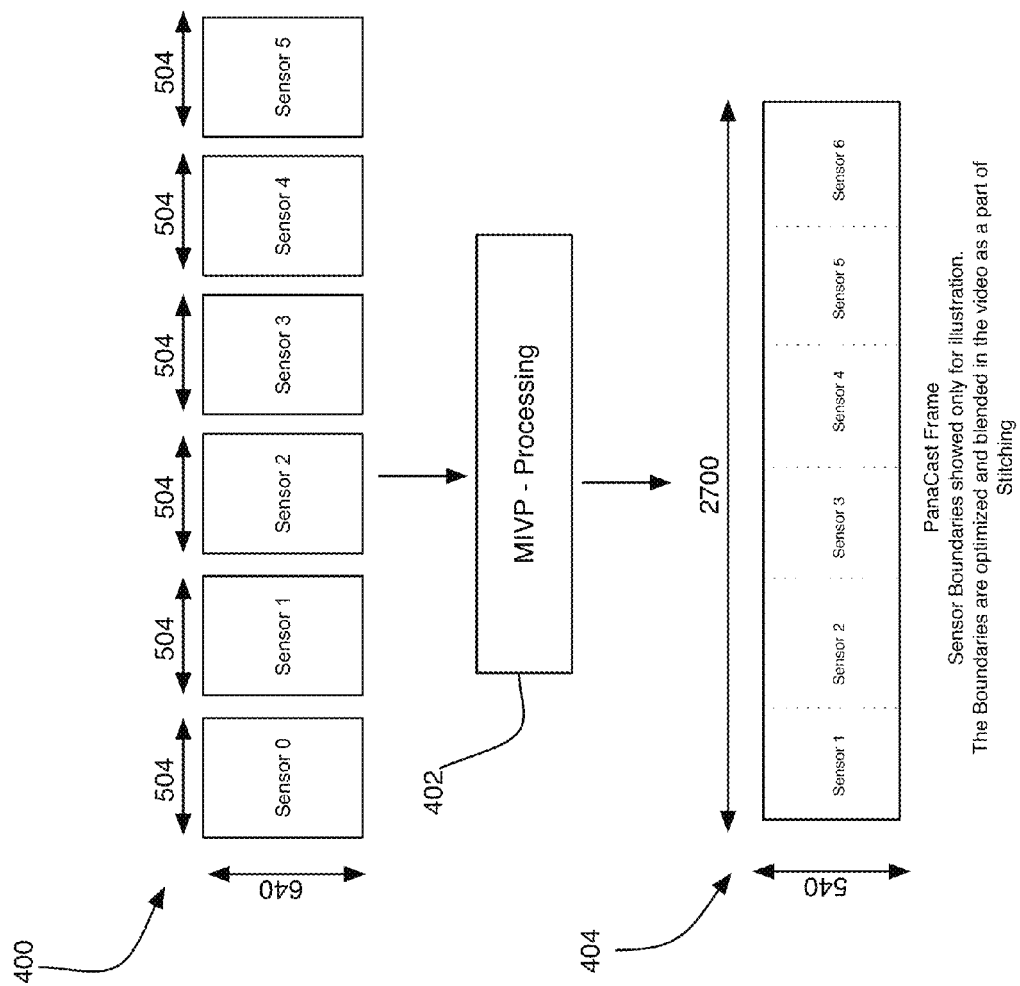
FIG. 4 illustrates the process for stitching images, in accordance with one embodiment of the invention.

FIG. 4 of the drawings illustrates the process of producing each frame of the PanaCast experience video, in accordance with one embodiment. Referring to FIG. 4, sensor data from a plurality of sensors 400 are fed into the MIVP 302. In one embodiment, the MIVP 302 may include a sensor synchronizer 308 to synchronize the sensors such that all the imagers are reading the same row number from the sensor pixel array and within up to 16 pixel clocks between the n imagers.

In one embodiment, once the imagers are synchronized the MIVP 302 may collect statistics for each overlapping region in the input frames 402, which are used to optimize the final PanaCast frame to blend in the seam boundaries to produce a uniform frame, which appears to come from a single source.

For stitching images from adjacent sensors, the MIVP 302 may include a stitching engine 310. In one embodiment, a stitching stats block 312 collects the following statistics from the portion of the sensor image, which constitutes the overlapping region between two adjacent sensors:
1. Macro Block Match between the two overlapping regions
2. Luma Delta between the two overlapping regions
3. Chroma Delta between the two overlapping region The overlapping regions of the image between the two sensors may be typically joined at a sharp angle. In one embodiment, a perspective correction block 314 may be executed to at least reduce this sharp angle by mapping the image plane onto a cylinder. This mapping results in the image appearing to be slightly curved instead of being joined at an angle.

In one embodiment, because the imagers 202 may be placed n an arc, each sensor is rotated by 90 degrees. Thus, in one embodiment, the MIVP pipelines are configured to process to rotated images. However, before stitching and generating the complete PanaCast frame the sensor frames are rotated back by 90 degrees.

Referring to FIG. 4, it will be seen that each sensor image that is stitched has dimensions of 640×504, whereas the PanaCast frame 404 has dimensions of 540×2700. Part of the processing performed by the MIVP 302 is to stitch and blend the images from the individual sensors so that the final PanaCast frame 404 appears to come from the single imager/sensor.

Each Panacast frame may be encoded by the compression engine 304. In one embodiment, an H.264 AVC encoder may be used as the compression engine 304. In one embodiment, the PCS 104 may be architected to be modular such that the compression engine 304 can easily be swapped or upgraded to current or new designs and standards such as VP8, H265-HEVC, etc.

In one embodiment, the Panacast frame 404 may have a wide field of view that may be greater than 100 degrees. In some embodiments, the field of view may be as high than 200 degrees.

In one embodiment, six image sensors, each having a resolution 640×504 may be rotated by 90 degrees such that the short sides of the sensors are parallel prior to stitching. In one embodiment, advanced stitching techniques such as is described in co-pending U.S. patent application Ser. No. 13/902,136 entitled "Locally Adaptive Luminance and Chrominance Blending in a Multiple Imager Video System", U.S. patent Ser. No. 13/902,186 entitled "Dynamic Stitching for a Multiple Imager Video System", and U.S. patent Ser. No. 13/902,248 entitled "Stitching for a Multiple Imager Video System Based On A Non-Linear Seam" may be used to perform the stitching.

In one embodiment, the MIVP 302 may write all the frames into an external memory 316 and to reads them back in a rotated format. The read back from the external memory 316 may be staged into local line buffers so that the stitching operations are performed on this locally stored image. In one embodiment, the stitching may be performed on an integer pixel boundary and overlapping pixels may be discarded In one embodiment, frame generator 318 formats each PanaCast frame and generates an encoder frame, which is optimized by frame optimizer 320 with the stitching statistics computed in the previous stage.

In one embodiment, within the compression engine 304, each encoder frame is fed into an optimized H264 encoder, which is optimized and tuned to deliver extremely low latency and high quality video to the transport server 306. As previously noted, the PanaCast camera may be modular in design and can be scaled to swap or add other video compression formats such as HEVC, VP8, M-Jpeg etc.

In one embodiment, the PCS 104 may be architected to generate Panacast video, which is in a non-standard video format of 2700×540 (standard formats of video are 3840× 2160, 1920×1080, 1280×720, 640×480, etc.). In one embodiment, if the compression engine 304 does not support non-standard formats than the frame optimizer 320 can reformat the PanaCast video into a standard format encoder frame. In one embodiment, multiple reformatting options may be used to enable video formats. In one embodiment, for reformatting on the Panacast video any of the techniques described in co-pending U.S. patent application Ser. No. 14/058,187 entitled "Repacking of Panoramic Video Based on Standard Image Formats", which is hereby incorporated herein by reference in its entirety may be used.

In one embodiment, transport servers 306 may reside in both the camera and in the cloud. The transport server 306 may deliver uncompressed video over HDMI or USB ports or deliver a compressed video stream to be delivered on RJ45, WiFi, USB, 3G or 4G links. In one embodiment, optional feedback of underlying transport link conditions may be used to further optimize the video.

Figure 9:
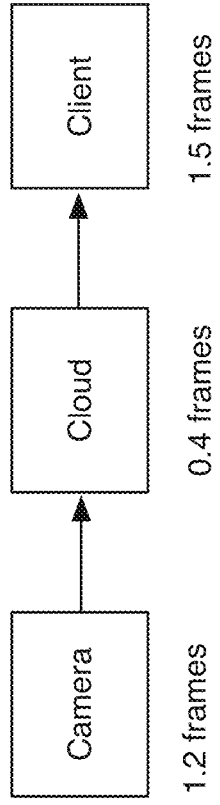
FIG. 9 shows a latency profile for the Panacast video system in accordance with one embodiment of the invention.

In one embodiment, the PanaCast camera not only creates a panoramic video with an extended field of view but may also be able to stream this panoramic video with extremely low latency making it very efficient to be used in a variety of applications. With a total of 1.2× the frame time latency through the camera, (see FIG. 9) the PanaCast camera becomes ideal for instant video communications and broadcast applications.

Figure 6:
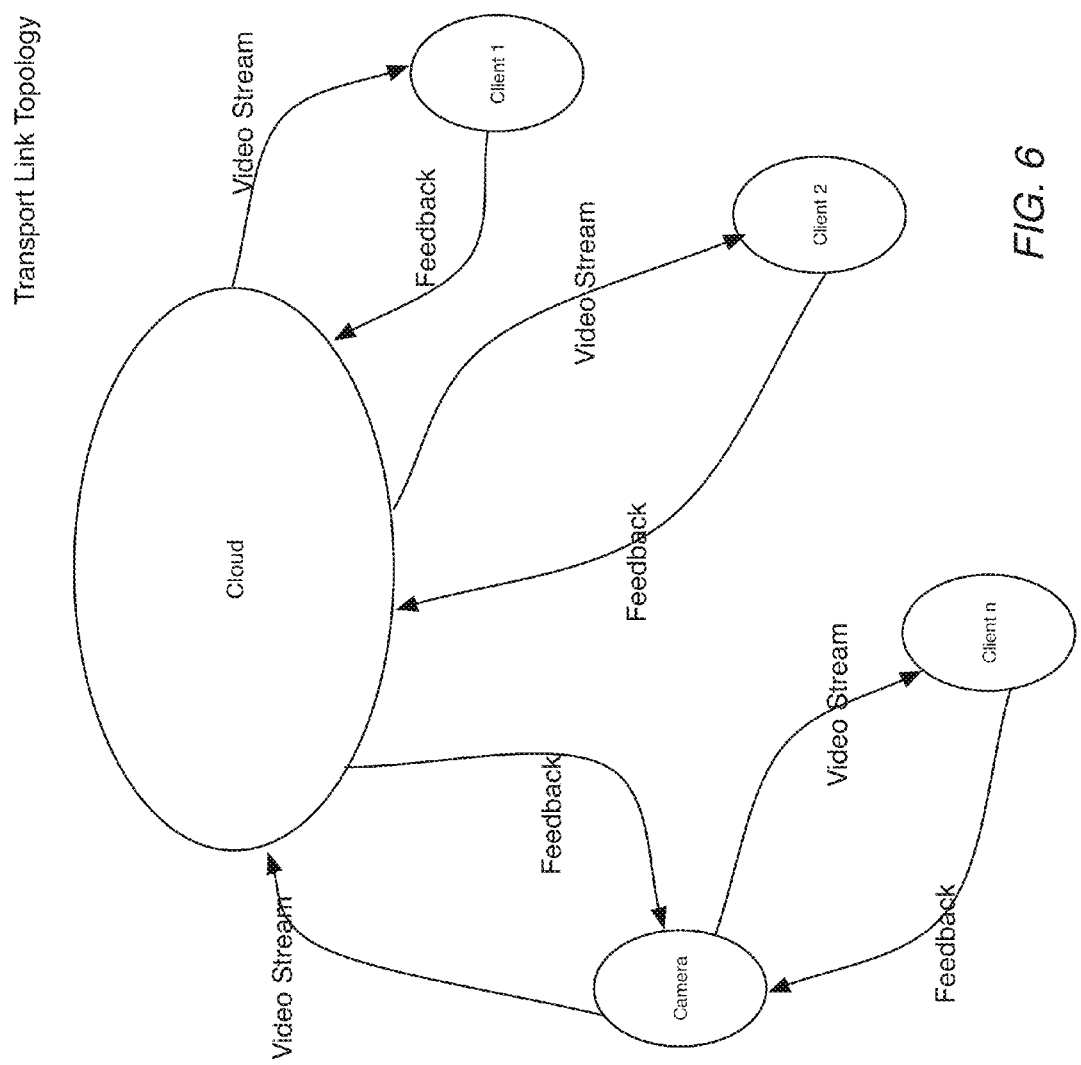
FIG. 6 shows a transport link topology in accordance with one embodiment of the invention.

In one embodiment, Pancasr video is delivered to each end user using transport links. FIG. 6 indicates the transport links that exist exists in the PanaCast system.
1. Transport link between the Camera and the Cloud
2. Transport link between the Cloud and the Client
3. Transport link between the Camera and the Client Each transport link carries the video link in the direction from a source to a destination and carries feedback on the link and destination characteristics.

Figure 7:
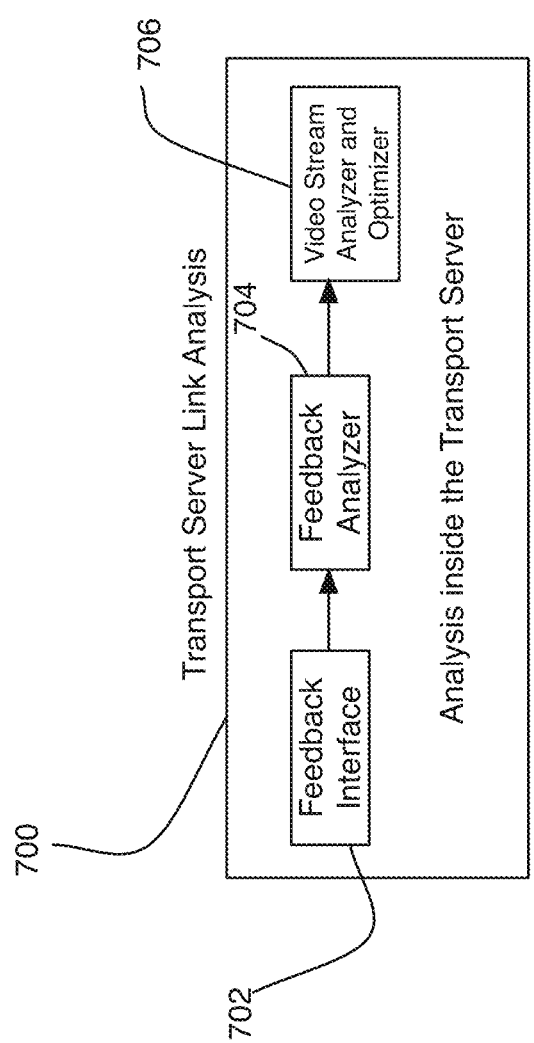
FIG. 7 shows a high-level block diagram of a transport server, in accordance with one embodiment of the invention.
Figure 8:
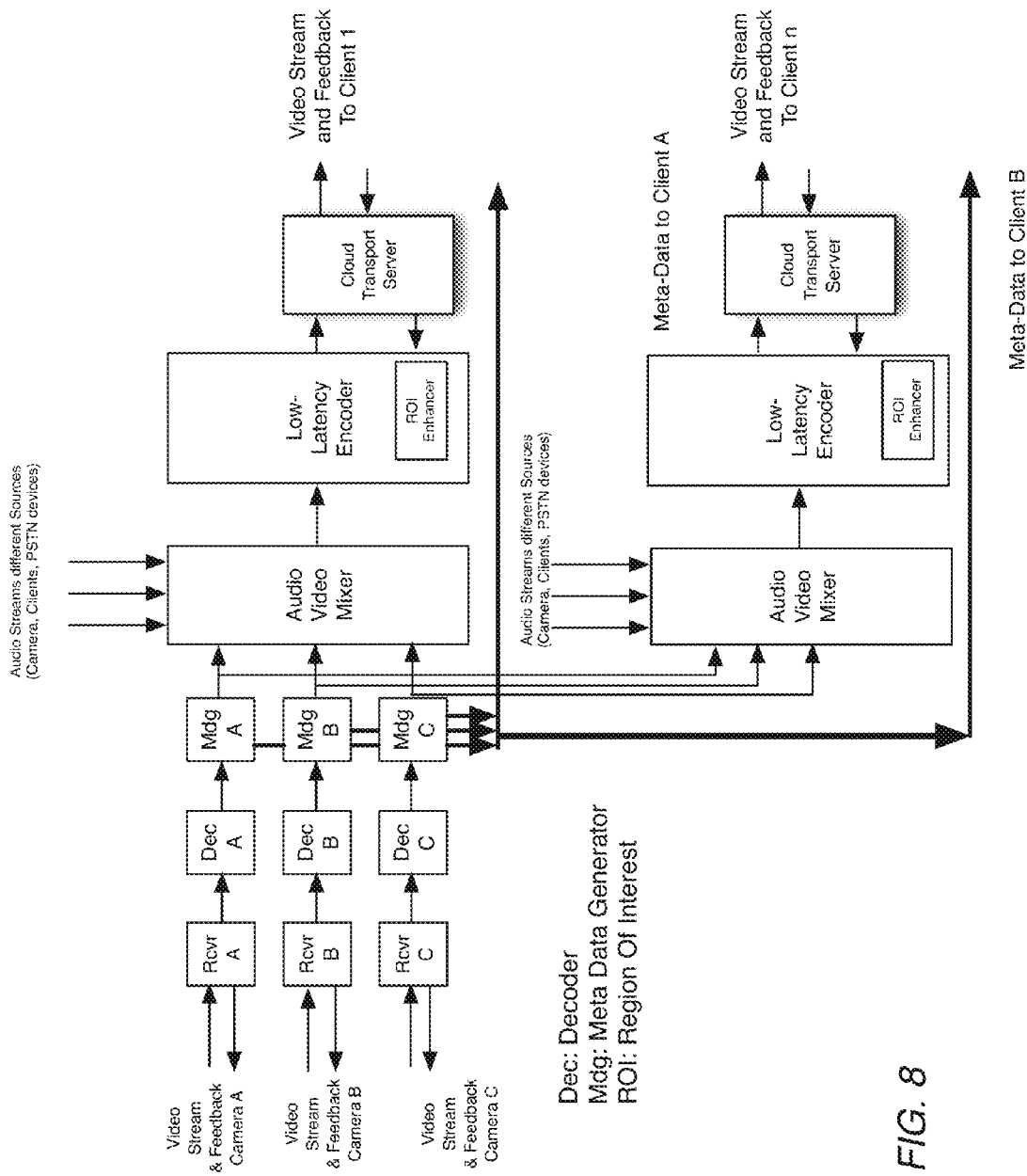
FIG. 8 shows a high-level block diagram of architecture for a cloud server, in accordance with one embodiment of the invention.

In one embodiment, a transport server running at the source (camera or cloud) includes a transport analyzer 700 (see FIG. 7), which analyzes feedback and adjusts the video stream. The transport analyzer 700 includes feedback interface 702, which is configured to collect feedback from each destination.

In one embodiment, the feedback may include the following information:
1. Packet Loss
2. Jitter
3. Round Trip Delay
4. Destination Type (Cloud, iOS client, Win 7 Client, Win 8 Client, Mac OS Client, etc.)
5. Destination Compute Resource Utilization
6. Destination Video Format (Standard or Non-Standard resolutions) Capabilities
7. Requested Video Format
8. Region Of Interest (ROI)
9. Feedback Frequency
10. Analytics Requests
11. DVR Requests
12. Instant Snap Requests In one embodiment, feedback analyzer 704 analyzes the feedback and provides transport statistics to a video stream optimizer 706, which adjusts the video stream. Based on the feedback the video stream optimizer 706 may be configured to adjust the following characteristics of the video and to extract analytics information from the video.
1. Average Bit Rate
2. Frame Rate
3. Resolution
4. Number of Slices in a frame
5. Average Bit Rate of the Region Of Interest (ROI)
6. Exposure Adjustment
7. Key Frame Injection
8. Refresh Period
9. Meta-Data for Video Analytics Traditional video conferencing systems often have a pan, tilt, zoom (PTZ) camera, which can be directed at an area of interest. This has many limitations, one of which is that multiple viewers cannot select different areas of interest at the same time (since the cameras mechanics can only physically point to one area at a time). In one embodiment, the systems disclosed herein allow for the capture of full panoramic video and for viewers of the video to independently pan and zoom in their view of the video, either through touch screen manipulation, touchpad/keyboard commands, or automatically through the gyro/accelerometer in mobile devices simply by moving the handheld device.

In one embodiment, individualized pan and zoom of panoramic video is realized by transmitting a per-participant stream from the cloud. Each stream is individualized by:
creating a new low-latency stream for each participant
adapting the quality of the stream (bit rate, frame rate and resolution) based on network conditions
selectively enhancing compression efficiency in the area of the image the user is currently looking at
selectively enhancing compression efficiency in the area of the image where an object of interest is found, for example—faces, whiteboard etc.
generation of meta data found within the panoramic image. Users could click on individual faces in the live video to:
Identify the name of the person
Starting a chat session with the person
Retrieving corporate database information of the person
Retrieving information from social networks
Looking up previous meetings that a particular person has attended
Looking up what a person said in a previous meeting as text In one embodiment, each PanaCast camera that is used in a conference is first streamed to a cloud server 106. In one embodiment, the quality of the camera feed to the cloud may be adapted to network conditions by continuously varying the bit rate, frame rate and the resolution. Each of the camera feeds are decoded, composited onto a canvas (specific to each user), encoded and streamed to the individual user as "downstreams". The quality of each of these downstreams may be adapted to the current network conditions by continuously varying the bit rate, frame rate and resolution, thus delivering an individualized stream to the end user.

In one embodiment, each end user has the ability to choose the region of interest he/she is interested in without interfering with the streams of other users.

Figure 5:
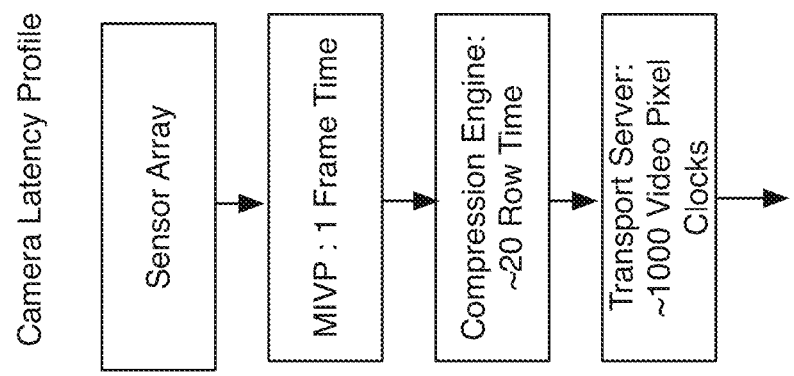
FIG. 5 shows a camera latency profile in accordance with one embodiment of the invention.

In order to facilitate real time communications, video must be sent to the client devices with low latency (delay). To enable this, in one embodiment, the encoding in the cameras utilizes predictive technology to output compressed video (e.g. NAL packets) with as low latency as 1 ms. FIG. 5 shows the camera latency profile, in accordance with one embodiment. In one embodiment, the camera may use video encoding techniques of are based on predictive bit allocation and rate adaptation. The cloud server 106 decodes, composites the multiple decoded streams into a individualized canvas, and encodes it with very low latency (typically in the order of 10 ms or less).

Figure 10:
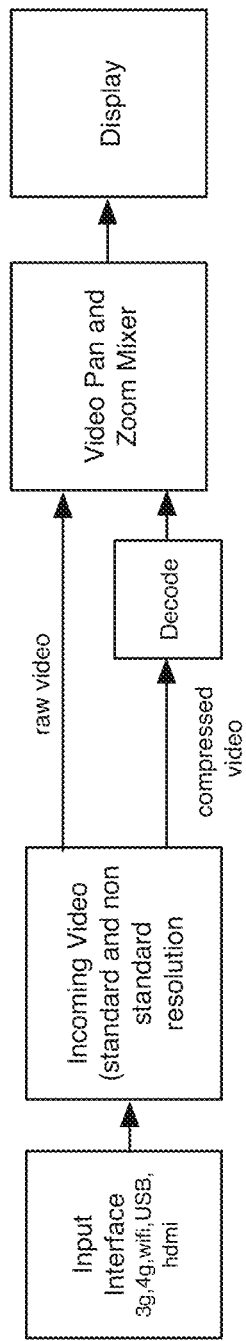
FIG. 10 shows a processing pipeline for a client device in accordance with one embodiment of the invention.

The PanaCast application allows a user to pan and zoom into the video, e.g. using touch gestures. Each user may also individually select which camera to view in the PanaCast session. The Panacst application may connect with the video being streamed from either the camera or the cloud through a transport link described above. There is a unique individual transport connection that is created between each client and the source of the video stream. This unique connection provides the clients with an individualized experience that lets them interact with our Panoramic video without affecting other clients viewing the video from the same source. FIG. 10 shows a video processing pipeline executing on a client device, in accordance with one embodiment.

In one embodiment, the cloud server 106 may optimize the audio channel for each viewer separately based on a region of interest (ROI) determined for that viewer. This is described in greater detail in co-pending U.S. patent application Ser. No. 14/058,192 entitled "Panoramic Streaming Of Video With User Selected Audio", which is incorporated herein in its entirety by reference.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for processing video, comprising;
capturing video at a first location from multiple sensors;
stitching images corresponding to the multiple sensors to produce a panoramic video having at least a 100° field of view;
processing the panoramic video at cloud-based server for delivery to a plurality of client devices, wherein the processing comprises optimizing the panoramic video based on a feedback received from each of the plurality of client devices; and
streaming the processed video to the plurality of client devices.

2. The method of claim 1, wherein the capturing and the stitching is by a multiple imager panoramic camera and is performed at a latency of less than 1.2 times a frame-time for rendered video.

3. The method of claim 1, wherein the cloud-based server processes the video with a latency of less than 0.4 times a frame-time for rendered video.

4. The method of claim 1, wherein the processing by the cloud-based server comprises customizing the panoramic video on a stream-by-stream basis, wherein each customized stream is customized for a particular client device based on region of interest (ROI) associated with said client device.

5. The method of claim 4, further comprising determining the region of interest (ROI) for each client device based on at least one of zooming and panning information received from the client device.

6. The method of claim 4, wherein each customized stream includes more bits in the video stream for areas corresponding to the region of interest (ROI) associated with that client device for that stream.

7. The method of claim 1, wherein the stitching is based on a non-linear seam selected from a region of overlap between two adjacent images.

8. The method of claim 1, wherein the stitching is based on a seam calculated between two adjacent images based on a technique that minimizes the temporal and spatial distortion seen when traversing the adjacent images in the region of overlap between the two images from top to bottom.

9. The method of claim 1, further comprising:
encoding the panoramic video by determining a number of slices into which to slice each input frame of the panoramic video;

determining a number of stacks associated with an output encoding; and slicing each input frame into the number of slices; and stacking each slice into encoded frames of the output encoding.

10. A system for video capture and delivery, comprising:

a camera with multiple sensors to capture video at a first location, and to stitch images corresponding to the multiple sensors to produce a panoramic video having at least a 100° field of view; and a cloud-based server to process the panoramic video for delivery to a plurality of client devices, and to stream the processed video to the plurality of client devices, wherein the processing comprises optimizing the panoramic video based on a feedback received from each of the plurality of client devices.

11. The system of claim 10, wherein the capturing and the stitching is performed at a latency of less than 1.2 times a frame-time of rendered video.

12. The system of claim 10, wherein the cloud-based server processes the video with a latency of less than 0.4 times a frame-time of rendered video.

13. The system of claim 10, wherein the processing by the cloud-based server comprises customizing the panoramic video on a stream-by stream basis, wherein each customized stream is customized for a particular client device based on region of interest (ROI) associated with said client device.

14. The system of claim 10, wherein the cloud-based server determines the region of interest (ROI) for each client device based on at least one of zooming and panning information received from the client device.

15. The system of claim 10, wherein each customized stream includes more bits in the video stream for areas corresponding to the region of interest (ROI) associated with that client device for that stream.

16. The system of claim 10, wherein the stitching is based on a non-linear seam selected from a region of overlap between two adjacent images.

17. The system of claim 10, wherein the stitching is based on a seam calculated between two adjacent images based on a technique that minimizes the temporal and spatial distortion seen when traversing the adjacent images in region of overlap between the two images from top to bottom.

18. The system of claim 10, wherein the camera encodes the panoramic video based on a technique comprising determining a number of slices into which to slice each input frame of the panoramic video; determining a number of stacks associated with an output encoding; slicing each input frame into the number of slices; and stacking each slice into encoded frames of the output encoding.

* * * * *